May 20, 1958

W. H. NEELY 2,835,316

WIRE SPRING STRUCTURE

Filed Feb. 18, 1957

INVENTOR.
WILLIAM H. NEELY
BY

ATT.

United States Patent Office

2,835,316
Patented May 20, 1958

2,835,316

WIRE SPRING STRUCTURE

William H. Neely, Cleveland, Ohio, assignor to The Universal Wire Spring Company, Bedford, Ohio, a corporation of Ohio Application February 18, 1957, Serial No. 640,687

5 Claims. (Cl. 155—179)

This invention relates in general to improvements in upholstered seat back spring constructions assembled from zigzag-shaped or sinuously corrugated wire springs mounted side by side on a frame crosswise thereof and, more particularly, to seat back spring constructions of this type in which the zigzag-shaped wire springs are individually reenforced by elongated auxiliary wire spring members secured with their opposite ends to spaced areas of the zigzag-shaped wire springs for cooperation therewith in contour-shaping these wire springs, increasing their yielding resistance against load deformation and distributing applied loads for best riding and resting comfort. Reenforced zigzag-shaped or sinuously corrugated wire springs of seat back spring constructions of the type referred to above should be free of localized stiffness under normal and shock load conditions and readily yield to loads applied in use. These requirements, however, are not fully satisfied in present day seat back spring constructions having their zigzag-shaped wire springs reenforced by auxiliary wire members which include substantially straight bodies provided at their ends with angularly offset corkscrew pigtails pivotally attaching the auxiliary wire members to spaced cross wire members of the zigzag-shaped wire springs. In these seat back spring constructions, the reenforced zigzag-shaped wire springs when loaded develop in their load-bent areas stresses opposed to axial yielding of these zigzag-shaped wire springs and thus proper control of these wire springs cannot be effected.

The primary object of the present invention is the provision of a V-shaped auxiliary wire spring member for reenforcing zigzag-shaped wire springs, the auxiliary wire spring member having a V-shaped body shaped by short and long straight lever arms and including corkscrew pigtail ends laterally extended from the lever arms to facilitate connection of the V-shaped auxiliary wire spring member to cross members of zigzag-shaped wire springs and counteract load stresses opposing axial yielding of zigzag-shaped wire springs while effecting stiffening of the wire springs in localized areas.

Another object of the invention is the provision of a V-shaped auxiliary wire spring member of the type referred to above, in which the short and long lever arms of the V-shaped body are extended in laterally spaced, substantially parallel planes and connected to each other by cross wire members to torsionally resist loads applied to zigzag-shaped wire springs by such cross members.

A further object of the invention is the provision of a V-shaped auxiliary wire spring member of the type referred to above, having the short and long lever arms near the apex of the V-shaped auxiliary wire member curved outwardly to opposed half-circular loops to stiffen these lever arms and blend same into the apex of the V-shaped auxiliary wire spring member.

In addition to the above described objects, the invention has other marked improvements and superiorities which radically distinguish it from presently known structures. These improvements or superior characteristics embodying certain novel features of construction are clearly set forth in the appended claims, and a preferred form of embodiment of the invention as applied to seat back spring constructions is hereinafter described and shown with reference to the accompanying drawing forming part of the specification.

Figure 1:
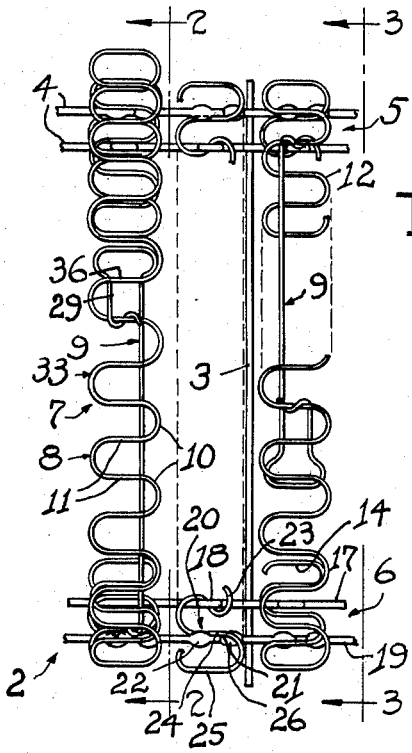
Fig. 1 is a fragmentary plan view of a seat back spring construction assembled of wire spring structures, each of which includes a zigzag-shaped wire spring reenforced by an auxiliary wire spring member constructed in accordance with the invention.
Figure 2:
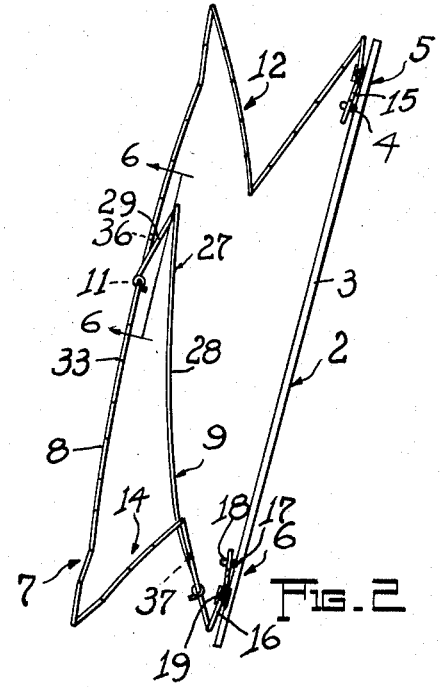
Fig. 2 is a sectional view on line 2—2 of Fig. 1.

Referring now more particularly to the exemplified form of the invention, the seat back spring structure shown for illustration and especially adapted for automobile seat back spring constructions embodies a frame structure 2 formed by wire stringers 3 and pairs of wire cross members 4 arranged in upper and lower areas 5 and 6 of frame structure 2. These pairs of wire cross members 4 are extended crosswise of the wire stringers 3 and welded thereto at the contact points therewith. Frame structure 2 removably supports on these pairs of wire cross members a plurality of wire spring structures 7 which include sinuously corrugated wire springs 8 reenforced by auxiliary wire spring members 9. These sinuously corrugated wire springs 8 have their opposite loops 10 connected by straight wire cross portions 11 extended substantially parallel to each other and are provided with sinuously corrugated V-shaped upper and lower wire supporting arms 12 and 14 removably attached to corresponding pairs of wire cross members by sinuously corrugated end levers 15 and 16 of the supporting arms. To permit such removable attachment, one wire cross member 17 of each pair of wire cross members 4 embodies a plurality of laterally spaced, sharply bent open loops 18 and the other wire cross member 19 of such pair embodies a plurality of laterally spaced seating and holding sections 20 formed in the wire cross member by flattening same in spaced areas so as to provide therein axially offset, oppositely arranged seating and holding portions 21 and 22. The sharply bent open loops 18 in wire cross members 17 and the seating and holding portions 21, 22 in wire cross members 19 oppose each other and cooperate with each other in seating and holding wire springs 8. For such purpose, end loops 23 on end levers 15 and 16 are threaded through sharply bent open loops 18 and wire cross portions 24 between end loops 23 and adjoining loops 25 are rested on seating portions 21 and retained by holding portions 22. When thus mounted, the wire cross portions 24 extend lengthwise of wire cross members 19, and the loops 25 contact the walls of recesses 26, particularly, when loops 25 are compressed by proper choice of the distance between wire cross members 17 and 19.

Reenforcing of sinuously corrugated wire springs 8 by auxiliary wire spring members 9 permits control of load contour and resiliency of the sinuously corrugated wire springs. Auxiliary wire spring members 9 each include a V-shaped body 27 formed by long straight lever arm 28 and short straight lever arm 29. These lever arms are acute angularly related to each other and are connected in laterally spaced relation by wire cross portions 30 which form the apex of V-shaped bodies 27. Lever arms 28 and 29 have corkscrew pigtail ends 31, 32 extended at a right angle from the lever arms and dimensioned for engagement with loop-connecting wire cross portions 11 of spring resting portions 33 and V-shaped upper and lower spring supporting arms 12 and 14. These corkscrew pigtail ends 31, 32 are sized to fit the length of wire cross portions 11 and have a pitch resulting in approximately one and one-quarter turns to provide laterally stable pivotal anchor connections between V-shaped auxiliary wire spring members 9 and wire cross portions 11 of the sinuously corrugated wire springs 8.

As shown, V-shaped auxiliary wire spring members 9 have the end portions 34, 35 of lever arms 28, 29 slightly extended through portions of sinuously corrugated wire springs 8 to properly encircle wire cross portions 11 by the corkscrew pigtail extensions 31, 32 and effect in preloaded and loaded wire spring structures cantilever-like connections of the auxiliary wire spring members 9 with wire springs 8, an arrangement which permits control of loaded wire spring structures by tensile and torsional stresses. Thus, in loaded spring structures the end portions 34, 35 of lever arms 28, 29 of auxiliary wire spring members 9 contact wire cross portions 36, 37 adjacent to wire cross portions 11 and effect cantilever-like coupling of wire springs 8 with auxiliary wire spring members 9 in resting portions 33 and supporting arms 12 or 14.

Wire spring structures constructed in accordance with the invention control flexibility and resiliency of the spring structures by torsionally twisting loop-connecting cross portions of the wire springs and lever arm connecting cross portions of the auxiliary wire spring members and will provide any desired resistance at any selected points of the wire spring structures.

Figure 3:
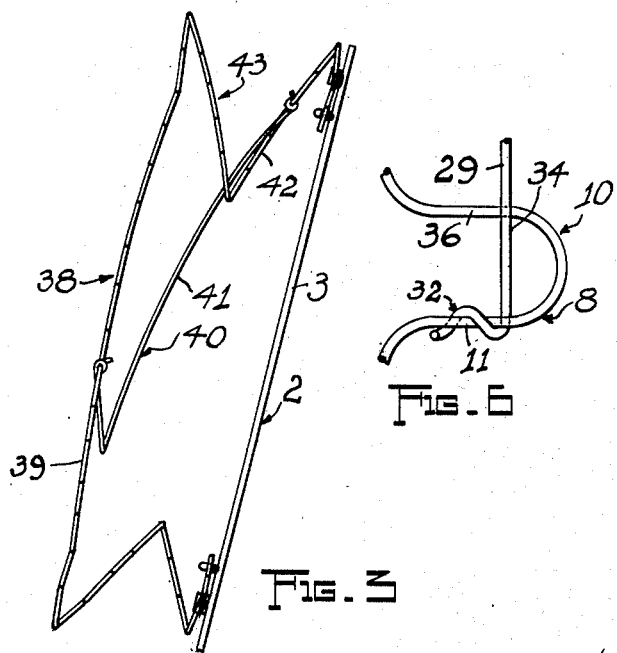
Fig. 3 is a sectional view on line 3—3 of Fig. 1.
Figure 6:
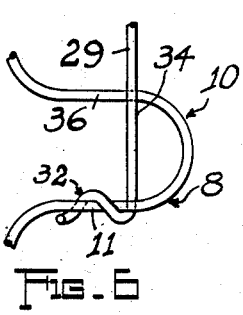
Fig. 6 is an enlarged fragmentary view of the coupling connection of one lever arm of the auxiliary wire spring member with the zigzag-shaped wire spring, the section taken taken on line 6—6 of Fig. 2.
Figures 4, 5:
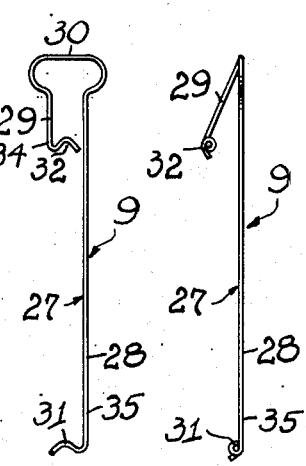
Fig. 4 is a plan view of the V-shaped auxiliary wire spring member.
Fig. 5 is a side view of Fig. 4.

Wire spring structure 38 (see Fig. 3) embodies sinuously corrugated wire springs 39 and auxiliary wire spring members 40 similar to wire springs 8 and auxiliary wire spring members 9 previously described. In this wire spring structure 38, auxiliary wire spring members 40 are attached by their long lever arms 41 to lever portions 42 of V-shaped upper supporting arms 43 of wire springs 39, otherwise wire spring structure 38 closely resembles previously described wire spring structure 7.

Having thus described my invention, what I claim is:

1. In a spring structure a corrugated wire spring comprising a resting portion and a supporting portion at each end thereof, one of the supporting portions being V-shaped and having angularly related sinuous arms connected to each other to form an inwardly disposed apex, and an auxiliary V-shaped reenforcing wire member including differentially sized laterally spaced straight lever arms connected by straight cross wire means forming the reenforcing member with a sharp-edged apex, the free ends of the straight lever arms being extended through the resting portion and supporting portion of the wire spring and secured thereto, said auxiliary V-shaped reenforcing member by its straight lever arms and their extension through said wire spring being coupled therewith in cantilever-like fashion and the sharp-edged apex of such auxiliary V-shaped reenforcing member being spaced from the resting portion of the corrugated wire spring.

2. A spring structure as described in claim 1, wherein said straight lever arms of the V-shaped reenforcing wire member is extended through the resting portion of the sinuously corrugated wire spring between the opposite ends of such resting portion and through a lever arm of the said one supporting portion of the wire spring in spaced relation with respect to the inwardly disposed apex of the supporting portion.

3. A spring structure as described in claim 1, wherein the longer one of said differentially sized straight lever arms of the V-shaped reenforcing wire member is extended through the resting portion of the sinuously corrugated wire springs between the opposite ends of such resting portion, and wherein the shorter one of said differentially sized straight lever arms is extended through the said supporting portion of the wire spring in spaced relation with respect to the inwardly disposed apex of the supporting portion.

4. A spring structure as described in claim 1, wherein the corrugated wire spring includes oppositely extended loops connected by straight cross members, wherein the differentially sized straight lever arms are extended through the wire springs between two adjoining cross members thereof, and wherein each of said latter lever arms is pivoted to one of two adjoining cross members and contacts the bottom face of the other one of said two adjoining cross members.

5. A wire reenforcing member for sinuously corrugated wire springs comprising a V-shaped wire body embodying two differentially sized straight lever arms axially spaced from each other and axially angularly related to each other and a short straight wire cross member connecting opposed ends of said straight lever arms, said short straight wire cross member forming the V-shaped wire body with a sharp-edged apex, and corkscrew means at the free end of each of the straight lever arms, each corkscrew means being extended from a straight lever arm in a rectangular relation toward the other lever arm to extend the corkscrew means in opposite directions with respect to each other.

References Cited in the file of this patent
UNITED STATES PATENTS 2,657,740   Daniels et al. _____ Nov. 3, 1953

FOREIGN PATENTS 15,847   Great Britain _____ 1912